US012761977B1

(12) United States Patent
Liu et al.

(10) Patent No.: US 12,761,977 B1
(45) Date of Patent: Oct. 13, 2026

(54) MANAGING CLOUD COMPUTING RESOURCES HOSTING INSTANCES WITH CUSTOMIZABLE BASELINE COMPUTE PERFORMANCE

(71) Applicant: Amazon Technologies, Inc., Seattle, WA (US)

(72) Inventors: Yuxuan Liu, Bellevue, WA (US); Keerthivasan Rajagopalan, Seattle, WA (US); Siyang Mai, Seattle, WA (US); Siwei Liu, Seattle, WA (US); Ethan John Faust, Seattle, WA (US); Anton Valter, Renton, WA (US); Saurabh Nirmal Modh, San Jose, CA (US); Erik Dragui Nestorovic, Seattle, WA (US); Aletta Johanna Blanken, Littleton, CO (US); Carlo Joseph Labianca, Seattle, WA (US); Rachel Wang, Seattle, WA (US); Saketh Kulapaka, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 836 days.

(21) Appl. No.: 17/855,292

(22) Filed: Jun. 30, 2022

(51) Int. Cl.
*G06F 9/50* (2006.01)
*G06F 11/34* (2006.01)

(52) U.S. Cl.
CPC .......... *G06F 9/5083* (2013.01); *G06F 9/5033* (2013.01); *G06F 9/5038* (2013.01); *G06F 11/3409* (2013.01)

(58) Field of Classification Search
CPC .... G06F 9/5083; G06F 9/5033; G06F 9/5038; G06F 11/3409
USPC .......... 718/104
See application file for complete search history.

(56) References Cited

U.S. PATENT DOCUMENTS

| | | | | |
|---|---|---|---|---|
| 8,773,998 | B2 * | 7/2014 | Polk | H04L 47/745 370/444 |
| 9,336,042 | B1 * | 5/2016 | Brenneman | G06F 9/5088 |
| 9,491,112 | B1 * | 11/2016 | Patel | G06F 9/5016 |
| 11,995,466 | B1 * | 5/2024 | Srikanta | H04L 67/02 |
| 2007/0055830 | A1 * | 3/2007 | Brenner | G06F 9/4881 711/153 |
| 2010/0153945 | A1 * | 6/2010 | Bansal | G06F 9/4881 718/1 |

(Continued)

*Primary Examiner* — Pierre Vital
*Assistant Examiner* — Daniel Trainor
(74) *Attorney, Agent, or Firm* — Nicholson DeVos Webster & Elliott LLP

(57) ABSTRACT

Techniques for managing cloud computing resources hosting instances with customizable baseline compute performance are described. A host system of a cloud provider network executes a compute instance, providing the compute instance with a baseline compute performance. A request to change the baseline compute performance of the compute instance is received, the request including an indication of a new baseline compute performance. The request is determined to be granted by determining that a difference between the baseline compute performance and the new baseline compute performance does not exceed an available baseline capacity of the host system. A configuration of the host system is updated to change the baseline compute performance of the compute instance to the new baseline compute performance while the compute instance remains in an executing state.

20 Claims, 10 Drawing Sheets

(56) References Cited

U.S. PATENT DOCUMENTS

| | | | | |
|---|---|---|---|---|
| 2013/0061233 | A1* | 3/2013 | Zhou | G06F 9/4881<br>718/103 |
| 2017/0237747 | A1* | 8/2017 | Quinn | G06F 21/602<br>726/29 |
| 2020/0218571 | A1* | 7/2020 | Chen | H04L 67/10 |
| 2021/0334141 | A1* | 10/2021 | Ou | G06F 13/18 |

* cited by examiner

MANAGING CLOUD COMPUTING RESOURCES HOSTING INSTANCES WITH CUSTOMIZABLE BASELINE COMPUTE PERFORMANCE

BACKGROUND

Cloud computing environments often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various examples in accordance with the present disclosure will be described with reference to the drawings, in which.

DETAILED DESCRIPTION

Figure 1:
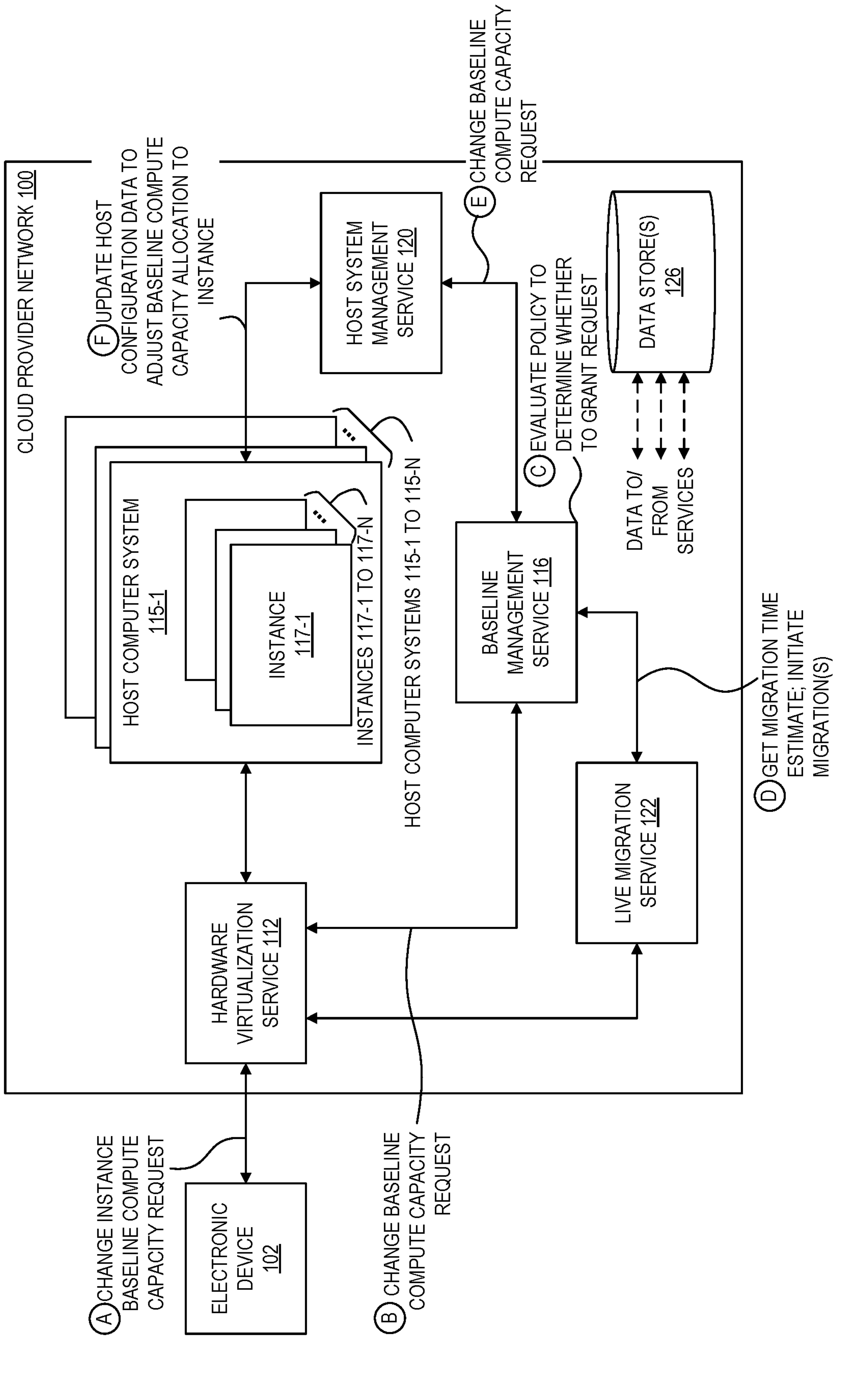
FIG. 1 is a diagram illustrating an environment for managing customizable baseline compute performance instances according to some examples.

The present disclosure relates to methods, apparatus, systems, and non-transitory computer-readable storage media for managing cloud computing resources hosting instances with customizable baseline compute performance. According to some examples, customers can launch compute instances in a cloud provider network with a baseline level of compute performance and later adjust that baseline level of compute performance up or down. For example, a customer can launch a compute instance that initially has a baseline compute performance of 10% of one virtual processor (vCPU). That compute instance might also offer some amount of memory, network bandwidth, and/or storage. The customer can later increase that baseline compute performance to 20% of a vCPU if, for example, the customer workload is compute-heavy. Another customer could have launched a compute instance and can later decrease the baseline compute performance to 5% of a vCPU if, for example, the customer is executing a workload that requires the amount of memory, network bandwidth, and/or storage capacity associated with the original compute instance having a 10% baseline compute performance but requires a lower amount of compute performance. Customers can continue to request adjustments to the baseline compute performance of their compute instances up or down, and the adjustments are carried out while the compute instance remains running.

Virtualization technologies allow many compute instances such as virtual machines and containers to execute in isolated environments while sharing the same underlying physical hardware of a host computer system. Cloud provider networks extend virtualization technologies by providing fleets of host computer systems on which customers of the cloud provider network can launch and manage compute instances. Cloud provider networks often offer various compute instance types having different characteristics to try to meet customer needs. For example, certain compute instances might have a fixed allocation of host system resources (e.g., compute, memory, network bandwidth, etc.). Other compute instance types might have a minimum baseline allocation of host system resources and offer the ability to go above that baseline for extended periods of time for an extra cost. While these latter-type compute instances provide some degree of flexibility for the cloud provider network to adapt to customer workloads, customers often lack fine-grained control of how the performance of their compute instance is parameterized. For example, one compute instance might offer 5% baseline compute performance of two vCPUs, 0.5 gigabytes (GB) of memory, and 1 gigabit/second (Gbps) of network bandwidth, while another instance type might offer 10% baseline compute performance of two vCPUs, 1 GB (GB) of memory, and 1.5 Gbps of network bandwidth. If the customer has a workload that uses 10% baseline compute performance of two vCPUs but only 0.5 GB of memory, that customer would likely select the larger, higher cost instance that meets their compute requirement. At the same time, the cloud provider network has now allocated additional memory and network bandwidth to that larger instance even though that additional 0.5 GB of memory and 0.5 Gbps of network bandwidth would go unused.

Customizable baseline compute performance compute instances decouple the compute performance of a compute instance from the other performance parameters like memory, bandwidth, storage allocation, etc. By offering customizable baseline compute performance compute instances, a cloud provider network can offer customers additional control over the performance parameterization of their compute instances.

Note that the phrase "baseline compute performance" refers to a minimum guaranteed sustained compute performance, typically as calculated over some period of time, provided that the idle time of the compute instance does not cause it to fall below that baseline level of compute performance. For example, if a customer workload is compute constrained on an instance having a baseline compute performance of 20% of two vCPUs, that compute instance has a sustained compute performance of at least 20% of two vCPUs when needed.

FIG. 1 is a diagram illustrating an environment for managing customizable baseline compute performance instances according to some examples. At a high level, a cloud provider network (also referred to as "provider network" or just "cloud"), such as cloud provider network 100, typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Exemplary resources offered by a cloud provider network include a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc.

The users (or "customers") of provider networks 100 can use one or more user accounts that are associated with a customer account, though these terms can be used somewhat interchangeably depending upon the context of use. Users can interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

To provide the above and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. A "hosted" resource is typically a resource, such as a compute instance, executed by or on one or more computer systems of the cloud provider network, which may be sited in a data center of the cloud provider network operator but also located on-prem or in facilities between such a data center and an end user or customer. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

The hardware virtualization service 112 (referred to in various implementations as an elastic compute service, a virtual machines service, a computing cloud service, a compute engine, or a cloud compute service) can enable users of the provider network 100 to provision and manage compute resources (also referred to generally as compute instances). For example, virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, the execution of compute instances is supported by a lightweight virtual machine manager (VMM). These VMMs enable the launch of lightweight micro-virtual machines (micro VMs) in non-virtualized environments in fractions of a second. These VMMs can also enable container runtimes and container orchestrators to manage containers as micro VMs. These micro VMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of micro VMs can be packed onto a single host. For example, a micro VM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

In some examples, the execution of compute instances is supported by containers. A container service (not shown) can be a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A customer or user of the provider network can send a request to launch a compute instance to the hardware virtualization service 112 via an electronic device 102 and an interface (e.g., an API, not shown) of the cloud provider network 100. The request can include an indication of the type of instance to launch. Different instance types can offer different degrees of performance and feature sets. One such type of instance is the customizable baseline compute instance. The following table provides example sizes of customizable baseline compute instances.

| Size | vCPUs | Memory (GB) | Baseline Compute Performance (per vCPU) |
|---|---|---|---|
| Nano | 2 | 0.5 | 5% |
| Micro | 2 | 1.0 | 10% |
| Small | 2 | 2.0 | 20% |
| Medium | 2 | 4.0 | 20% |
| Large | 2 | 8.0 | 30% |
| XL | 4 | 16.0 | 40% |
| 2XL | 8 | 32.0 | 40% |

As explained above, the hardware virtualization service 112 can enable users of the provider network 100 to provision and manage compute resources, including customizable baseline compute instances. A fleet of host computer systems (or "host systems") 115-1 through 115-N provides the capacity on which to launch compute instances. As indicated, each host system 115 can execute various compute instances. For example, the host system 115-1 is illustrated as hosting compute instances 117-1 through 117-N. In servicing a launch request, the hardware virtualization service 112 can leverage one or more other control plane services of the cloud provider network 100. For example, the hardware virtualization service 112 send a request to a placement service (not shown), the request for an identification of one or more candidate host systems 115 on which to configure and launch the burstable instance. Once a suitable host system 115 has been identified, the hardware virtualization service 112 can configure and launch a compute instance on the host system 115.

During an initial launch of a compute instance, the hardware virtualization service 112 can configure a scheduler of a host system 115 (not shown) or cause the scheduler to be configured (e.g., via an agent such as a virtual machine manager) to provide the baseline compute performance to the compute instance being launched as part of configuring the host system 115 to execute a compute instance. For example, if a customer requests the launch of a small customizable baseline performance compute instance, the hardware virtualization service 112 can cause a scheduler of the identified host system 115 to allocate at least 20% of two vCPUs to the compute instance when needed by the software executed by the compute instance.

Customizable baseline performance compute instances allow customers to adjust the baseline performance per vCPU associated with their instance after launch and while the instance is running. As indicated at circle A, a customer can send a request to change a baseline compute performance of an existing compute instance to the hardware virtualization service 112 (e.g., via an electronic device 102 and the interface (not shown) of the cloud provider network 100). The baseline compute performance change request can include an identifier of the existing instance and an indication of a new baseline compute performance, typically expressed as a percentage of a vCPU as described herein. In the illustrated example, the hardware virtualization service 112 offloads baseline compute performance change requests to a baseline management service 116 as indicated at circle B.

Upon receipt of a baseline compute performance change request including the compute instance identifier and the indication of the new baseline compute performance, the baseline management service 116 evaluates baseline compute performance change requests against one or more policies to determine whether to grant the request as indicated at circle C. Additional details of the operations of the baseline management service 116 are illustrated and described at least with reference to FIG. 4.

In some embodiments, such a request can be conditionally granted for a compute instance on a host system upon the live migration of one or more other instances hosted on the same host system to one or more different host systems. As indicated at circle D, if a baseline compute performance change request can be accommodated conditioned upon a live migration, the baseline management service 116 can check whether the time required for the live migration would satisfy a policy requirement, for example, and, if so, request a live migration via a live migration service 122.

Migration refers to moving compute instances (and/or other resources) between hosts in a cloud computing network or between hosts outside of the cloud computing network and hosts within the cloud. There are different types of migration including live migration and reboot migration. Techniques for various types of migration involve managing the critical phase—the time when the virtual machine instance is unavailable to the customer-which should be kept as short as possible.

During a reboot migration, the customer experiences an outage and an effective power cycle of their virtual machine instance. For example, a control plane service can coordinate a reboot migration workflow that involves tearing down the current domain on the original host (the "source") and subsequently creating a new domain for the virtual machine instance on the new host (the "target" or "destination"). The instance is rebooted by being shut down on the original host and booted up again on the new host.

Live migration refers to the process of moving a running virtual machine instance between different physical machines without significantly disrupting the availability of the virtual machine instance (e.g., the down time of the virtual machine instance is not noticeable by the end user). The live migration service 122 manages the live migration of instances from a "source" host system 115 to a different "destination" host system 115. Upon receipt of a live migration request (e.g., from the baseline management service 116), the live migration service 122 can issue a request to a placement service (not shown), the request for an identification of one or more candidate host systems on which to place a burstable instance of the same type and size being migrated. The live migration service 122 can select a candidate host system ("destination" host system), if multiple, and issue a request to the hardware virtualization service 112 to allocate and launch an instance of that type and size on the destination system in a paused state (e.g., a new "inactive" domain associated with the instance is created on the target host system, while the original domain for the instance continues to run as the "active" domain on the source host). The live migration service 122 can then cause the state (e.g., vCPU registers, memory, storage data, network connectivity, etc.) of the burstable instance in the "active" domain to be captured on the source host system, transferred to the destination host system, and loaded into the corresponding state data for the instance in the "inactive" domain on the destination host system. For example, a local migration manager running on the source host system can send memory pages to the target host (also referred to as the "state" of the instance), track changes to the memory pages, and continue sending the changed pages to the target host. The instance may be briefly paused to prevent state changes while transferring a final set of memory contents to the target host. Thereafter, one or more of the control plane, the local migration manager, and the hypervisors (on the source and target hosts) can transition the inactive domain to become the active domain and demote the original active domain to become the inactive domain (sometimes referred to as a "flip"), after which the instance begins running on the target host, and the inactive domain can be discarded.

If the baseline management service 116 determines to grant a baseline compute performance change request, the baseline management service 116 can issue a baseline compute performance change request to a host system management service 120 as indicated at circle E, the request including the compute instance identifier and an indication of the new baseline compute performance. The host system management service 120 can update configuration data of compute instances executing on host systems 115 as indicated at circle F, including adjusting the baseline compute performance of compute instances executing on host systems 115. For example, the host system management service 120 can update configuration data of a scheduler of a host system 115 to change the baseline compute performance of a compute instance.

Additionally, the host system management service 120 can collect usage metrics from individual host systems 115 and generate statistical metrics therefrom. For example, the host system management service 120 can collect an aggregate physical processor utilization (e.g., per socket) for each physical processor in a host system and per-instance vCPU utilizations. The host system management service 120 can store peaks of each measurement (as compared to the last peak) in the data store(s) 126 and can also update statistics such as average utilization per-physical processor and per-instance stored in the data store(s) 126.

Data store(s) 126 store various configuration and tracking data used by the other illustrated components as part of launching customizable baseline compute performance instances and managing those customizable baseline compute performance instances and the fleet.

Communications between components illustrated within the cloud provider network 100 are typically carried out via API. For example, the electronic device 102 and/or the live migration service 112 can call an API of the hardware virtualization service 112 to launch compute instances. The hardware virtualization service 112 can call an API of a host system 115 to allow for the allocation of resources for and the launch of compute instances. The hardware virtualization service 112 can call an API of the baseline management service 116 to support baseline compute performance changes. The baseline management service 116 can call an API of the host system management service 120 to support baseline compute performance changes. The baseline management service 116 can call an API of the live migration service 122 to obtain migration time estimates and to initiate live migrations. The live migration service 122 can call an API of host systems 115 to pause, transfer state, and resume compute instances involved in live migrations. The host system management service 120 can call an API of a host system 115 to support baseline compute performance changes and to collect various performance metrics.

Figure 2:
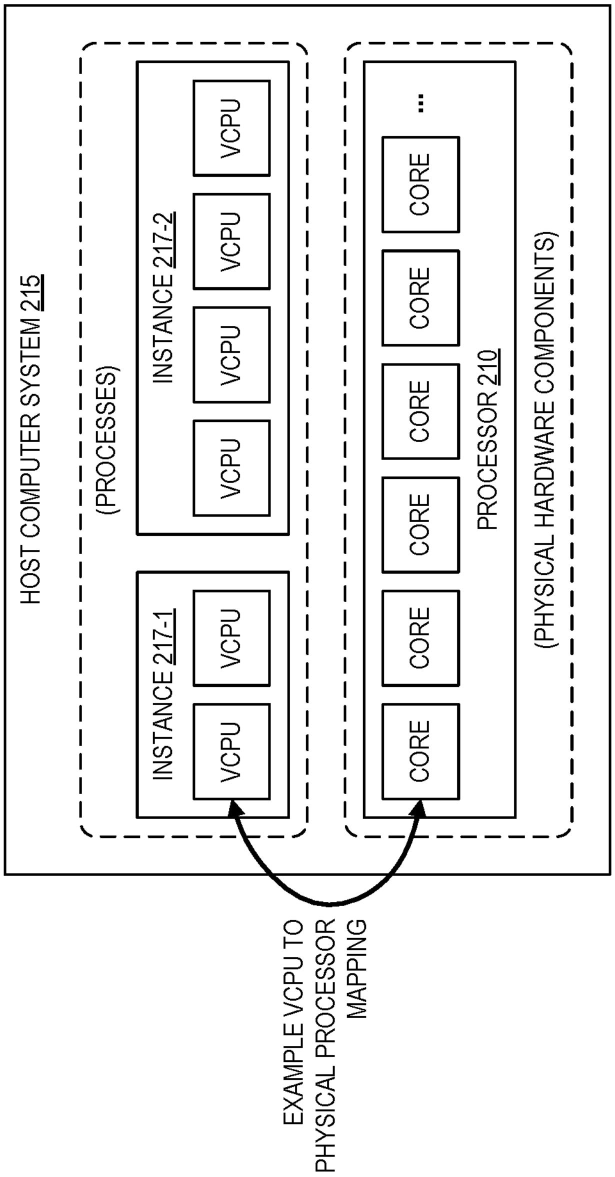
FIG. 2 is a diagram illustrating a relationship between virtual processors (vCPUs) and physical host system resources according to some examples.

FIG. 2 is a diagram illustrating a relationship between virtual processors (vCPUs) and physical host system resources according to some examples. A vCPU represents an abstraction of the underlying physical processor or processor components allocated to instances on host systems. In the illustrated example, a host system 215 has a processor 210. Depending on the architecture of the processor 210, the processor 210 may have multiple cores (e.g., 48 cores, 64 cores, etc.). The host system 215 may have additional processors (not shown). Also illustrated in the example is an instance 217-1 having two associated vCPUs and an instance 217-2 having four associated vCPUs. In virtualization, the instances 217 typically correspond to processes executed by the host system 215. One exemplary mapping between vCPUs and processing units of the vCPU is a vCPU corresponding to a core. Another exemplary mapping is a vCPU corresponding to a hyper-thread of a core, assuming the core architecture supports hyper-threading.

Note that a scheduler (not shown) will allocate processing units (e.g., cores, hyper-threads, etc.) to different processes in units of time typically called time slices. Thus, the processing unit on which a process is executed can and likely does change over time. For example, the instance 217-1 might operate on two cores during one time slice and on two different cores during a later time slice. Over time, the scheduler operates to guarantee the baseline compute performance of each instance 217, provided the instances are not idling.

Because a vCPU is abstracted from the underlying hardware, the vCPU can be used as a unit of measurement. Ten percent of one vCPU might correspond to 5% of the time slices on one core and another 5% of time slices on another core.

In some examples, compute instances can be advertised based on their actual physical compute unit instead of using the vCPU abstraction (e.g., instance type/size "Z" has a baseline of 40% of a core of a particular multi-core processor). In such cases, the compute instances can still be scheduled on different cores, again provided the baseline compute performance is satisfied over time.

Figure 3:
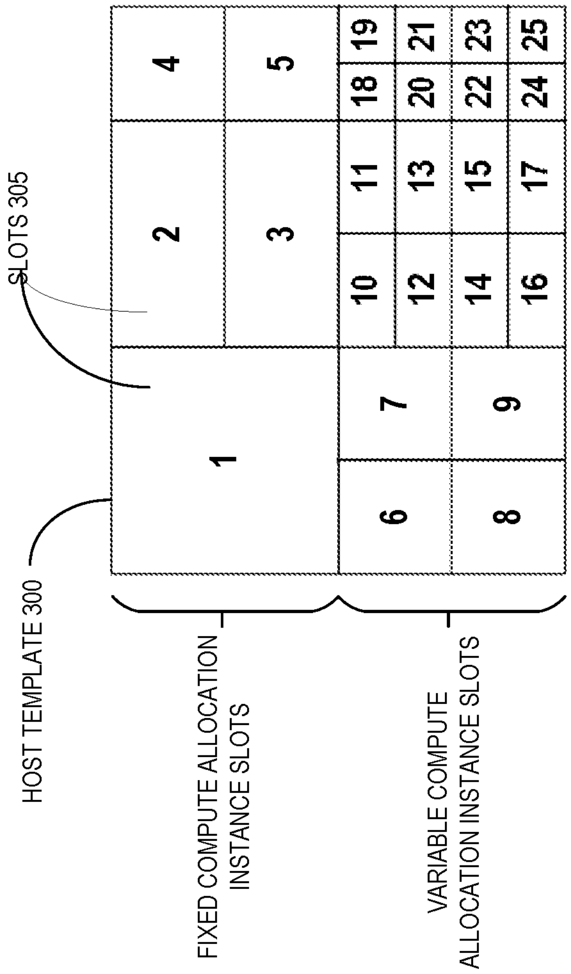
FIG. 3 is a diagram illustrating aspects of host capacity management according to some examples.

FIG. 3 is a diagram illustrating aspects of host capacity management according to some examples. One way of tracking host system capacity is via a "template." Templates serve to logically divide a host system's available resources into "slots," where each slot represents capacity for a given instance type. In FIG. 3, a template 300 with slots 305 to divide up a host system's compute capacity is illustrated graphically. As shown, slots 305 are enumerated 1 through 25. The total area of slots 305 represents the host system's "total compute capacity," which may be calculated as a function of vCPUs. For example, if the system includes one processor socket, the processor having 48 cores, and the vCPU processing unit is a core, the total compute capacity of the system would be 48 vCPUs less any overhead associated with system functions.

In some examples, a host system's total compute capacity can be divided into slots of various sizes of one type of compute instance. In other examples, a host system's compute capacity can be divided into slots of various sizes for multiple types of compute instances. For example, template 300 divides the compute capacity of a host system into two portions: one portion for fixed-compute allocation instances (slots 1 through 5) and another portion for variable-compute allocation instances (slots 6 through 26), including customizable baseline compute performance instances. Slots 1 through 5 represent fixed instance compute capacity, while slots 6 through 26 represent remaining compute capacity (e.g., total compute capacity minus fixed instance compute capacity). That portion of remaining compute capacity can be treated as total baseline compute capacity and divided up amongst variable-compute vCPU allocation slots. This allows variable compute capacity instances to be more densely packed as compared to the fixed compute allocation instances.

In the illustrated example, if the area of slot 1, for example, represents a "large" fixed-allocation 1 vCPU, the areas of slots 6 through 9 can each represent a "large" variable-compute vCPU allocation having a 25% baseline compute performance (or 0.25 vCPUs). Each such instance would have approximately 25% of a vCPU at baseline, and up to 100% vCPU utilization at maximum for short amounts of time or for additional cost (e.g., if one instance is executing and the other three are idle). Similarly, if slots 2 and 3 each represent "medium" fixed-allocation 0.5 vCPU slots, slots 10 through 17 can each represent "medium" variable-compute vCPU allocation of 0.125 vCPU slots. And if slots 4 and 5 each represent "small" fixed-allocation 0.25 vCPU slots, slots 18 through 25 can each represent "small" variable-compute vCPU allocation of 0.0625 vCPU slots. Of course, the relationship between different types of instances and their respective sizes need not be fixed or regular.

Various host system configuration data can be tracked in the data store(s) 126 by the services of the cloud provider network. Each host can have an associated host identifier. For each host identifier, "host template data" can track, which template is assigned to the host identifier. "Host slot tracking data" can be used to track, for each slot of a template associated with a host, the slot status. Exemplary slot statuses include "available," "used," and "reserved." Host slot tracking data can further identify, by instance identifier, which instance is occupying a "used" slot or "reserved" slot.

Figure 4:
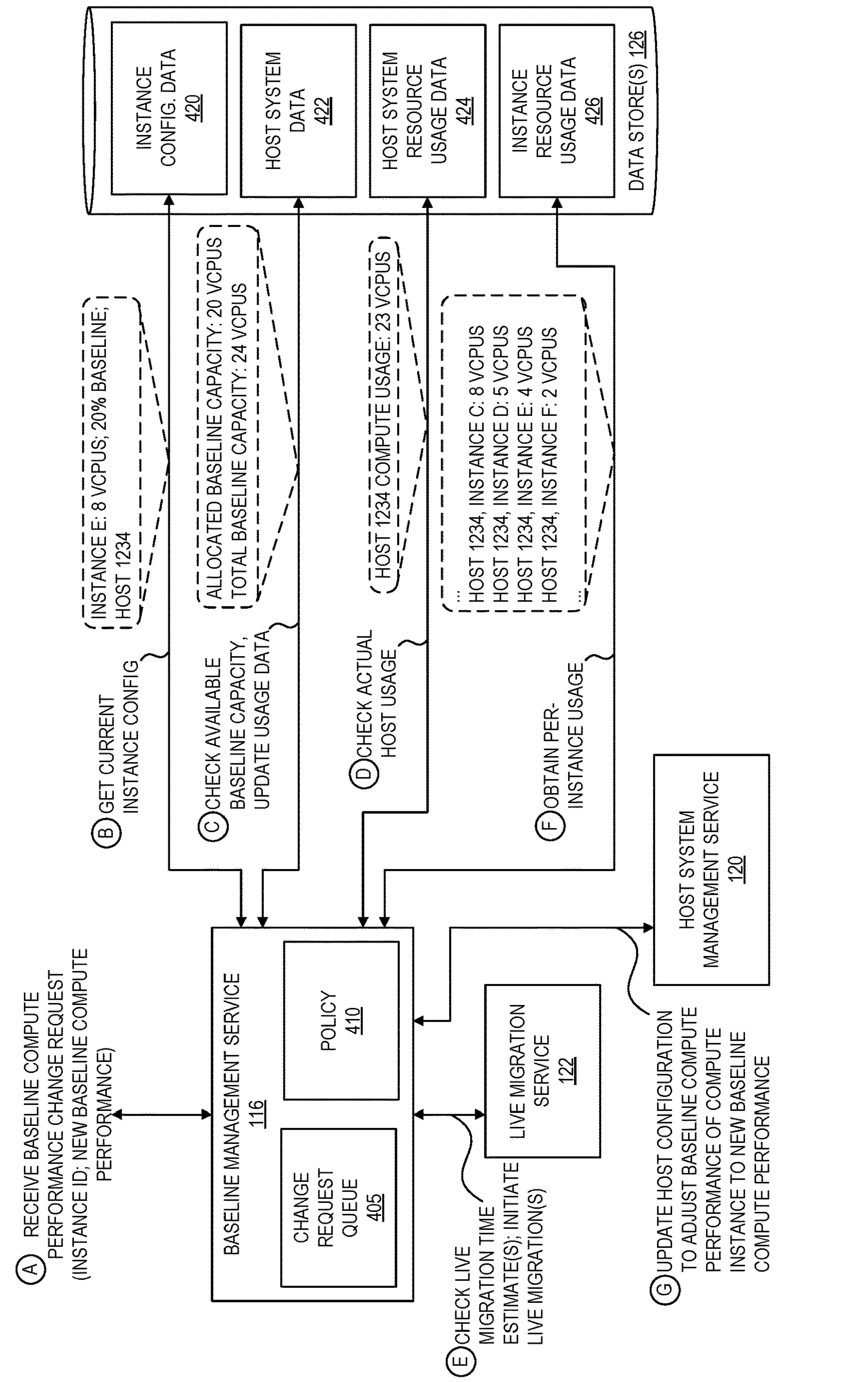
FIG. 4 is a diagram illustrating aspects of evaluating requests to change baseline compute performance according to some examples.

FIG. 4 is a diagram illustrating aspects of evaluating requests to change baseline compute performance according to some examples. In particular, the baseline management service 116 can evaluate a policy 410 to determine whether to grant or deny requests to change a baseline compute performance of a compute instance. Policy 410 can include one or more requirements ("policy requirements"). In describing these aspects, various calculations are carried out in vCPU units and using an exemplary set of usage metrics, although other examples may use different units or different usage metrics.

As indicated at circle A, the baseline management service 116 receives a request to change the baseline compute performance of an instance, the request including an identification of the compute instance and an indication of the new baseline compute performance. For example, the request might identify an instance "E" and the new baseline compute performance might indicate 40% per vCPU.

The baseline management service 116 can store pending requests in a change request queue 405.

As indicated at circle B, the baseline management service 116 can obtain the current configuration of the instance from instance configuration data 420 stores in data store(s) 126, the configuration including an indication of a number of vCPUs allocated to the instance and an associated baseline compute capacity. In this example, instance E has an 8 vCPU, 20% baseline compute performance allocation, or 1.6 vCPUs. The baseline management service 116 can also obtain the identifier of the host system on which the compute instance is being executed, here host system "1234."

As indicated at circle C, the baseline management service 116 can obtain baseline capacity data from host system data 422 in data store(s) 126. Exemplary host system data 422 can include an association between a host system and a template and, for each slot defined by the template, a status identifier (e.g., available, used, reserved). Host system data 422 can further include a total baseline capacity (e.g., the number of vCPUs allocated to slots 6 through 25 of FIG. 3). Host system data 422 can further include an allocated baseline capacity to indicate the amount of baseline capacity that has been allocated or otherwise reserved and/or a remaining baseline capacity to indicate the amount of baseline capacity that has not been allocated or otherwise reserved. Of course, the baseline management service 116 can also calculate the total baseline capacity of a host system (e.g., the total number of vCPUs associated with variable-compute allocation instance slots), the allocated baseline capacity (e.g., the number of vCPUs associated with allocated other otherwise reserved slots), and/or the remaining baseline capacity (e.g., the difference between the total baseline capacity and the allocated baseline capacity, or the number of vCPUs with unallocated or otherwise available slots).

One policy requirement is based on available baseline compute capacity. For example, if the available baseline capacity of the host system is less than the requested change in the baseline compute performance of the compute instance, the baseline management service 116 can deny the request. For example, if instance E has a current baseline compute performance of 20% per vCPU and 8 associated vCPUs, a request to change that baseline compute performance to 40% would entail a 1.6 vCPU increase. As shown, host system 1234 has a total baseline capacity of 24 vCPUs and an allocated baseline capacity of 20 vCPUs. Consequently, the baseline management service 116 can determine that the available baseline compute capacity policy requirement can be satisfied (e.g., 4 vCPU available baseline capacity is greater than the 1.6 vCPU baseline compute performance increase). In some examples, if the available baseline compute capacity policy requirement fails, the baseline management service 116 can first try to remediate the failure with the live migration service 122, as discussed below, before denying the request.

In some examples, one or more scale factors can be used to adjust the delta increase in baseline compute capacity and/or the total baseline capacity. For example, if the cloud provider network has a high confidence that it can migrate instances before baseline performance levels are violated, the baseline management service 116 could apply a scale factor to increase the total available capacity of a host system or to decrease the delta increase in the baseline compute performance of an instance. In the above example, a scale factor of 1.1 would increase the total baseline capacity in the above example from 24 vCPUs to 26.4 vCPUs. Similarly, a scale factor of 0.9 would decrease the baseline capacity increase associated with the request from 1.6 vCPUs to 1.44 vCPUs.

Another policy requirement is based on host compute resource utilization. For example, if the average compute utilization of the host plus the requested baseline compute performance increase is greater than some threshold below the total baseline capacity of the host system, the baseline management service 116 can deny the request. Such a requirement can preserve some baseline compute capacity overhead for instances to use above their baseline compute performance rather than force all instances to operate at their baseline compute performance. An example threshold is 10% of the total baseline compute capacity.

As indicated at circle D, the baseline management service 116 can obtain compute usage data from host system resource usage data 424 in data store(s) 126. Host system resource usage data 424 can include various metrics and/or statistics related to host system resource utilization including, for example, the average compute utilization of the host. As shown, host system 1234 has a compute usage of 23 vCPUs. Here, a 10% threshold would be 2.4 vCPUs less than the total baseline compute capacity or 21.6 vCPUs. Because the average compute utilization of the host (23 vCPUs) plus the requested baseline compute performance increase (1.6 vCPUs) is above that threshold, the baseline management service 116 can deny the request. As in the case of the available baseline compute capacity policy requirement, if the host compute resource utilization policy requirement fails, the baseline management service 116 can first try to remediate the failure with the live migration service 122, as discussed below, before denying the request.

Another policy requirement can limit the number of changes to a compute instances baseline compute performance within a window of time. For example, the baseline management service 116 can persist granted change requests in the queue 405 for a fixed period of time. If a request to change a baseline compute performance of an instance arrives while that instance identifier exists in the queue 405 from a previously granted change request, the baseline management service 116 can deny the request. In some examples, such a policy can be limited to increases to baseline compute performance.

Another policy requirement can limit the number of co-pending requests to change baseline compute performance of instances on the same host system. For example, if the baseline management service 116 determines that a second request to change the baseline compute performance of a compute instance is of a compute instance on a host system that is already associated with an existing, first change request in the queue 405, the baseline management service 116 can deny the second request.

Another policy requirement can be based on the cloud provider network's ability to live migrate one or more instances in a timely manner. As indicated above, in some cases the baseline management service 116 can attempt to accommodate a baseline compute performance change request via live migration(s). If, for example, either the baseline compute capacity policy requirement or the host compute resource utilization policy requirement fails, the baseline management service 116 can obtain an estimated time to live migrate another instance on the same host system to another host system as indicated at circle E. In some examples, the live migration service 122 can provide an estimated time to migrate an instance based on, for example, a number of other pending live migrations. If the estimated time is greater than some threshold specified in a live migration policy requirement, the baseline management service 116 can deny the request. For example, if the time threshold is two minutes and the live migration service 122 provides a three minute estimate, the baseline management service 116 can deny the request. If the time estimate is below the threshold, however, the baseline management service 116 can initiate a live migration of one or more other compute instances hosted on the host system co-hosting the compute instance associated with the baseline compute performance change request also as indicated at circle E. The baseline management service 116 can select the compute instance(s) to migrate in a number of ways. For example, the baseline management service 116 can select the largest other compute instance hosted by the host system. As another example, the baseline management service 116 can select the compute instance having the highest vCPU utilization as determined by per-instance vCPU utilization metrics obtained from the instance resource usage data 426 in data store(s) 126 as indicated at circle F.

If a request to change the baseline compute capacity of an instance is granted, the baseline management service 116 can update the host system data 422 to account for the changed baseline capacity allocation. Examples of various updates are described below with reference to FIG. 5.

Another policy requirement can be based on an amount of potentially orphaned compute capacity and is described below with reference to FIG. 5.

Assuming the policy requirement(s) are satisfied, the baseline management service 116 can send a request to the host system management service 120 to change the baseline compute performance of the compute instance to the new baseline compute performance as indicated at circle G. The request can include the host identifier, the instance identifier, and an indication of the new baseline compute performance.

Note that the policy requirements to reduce a baseline performance level associated with a compute instance can be lessened or eliminated given the concern of oversubscribing the total baseline capacity or increasing the heat of a host system is reduced.

Figure 5:
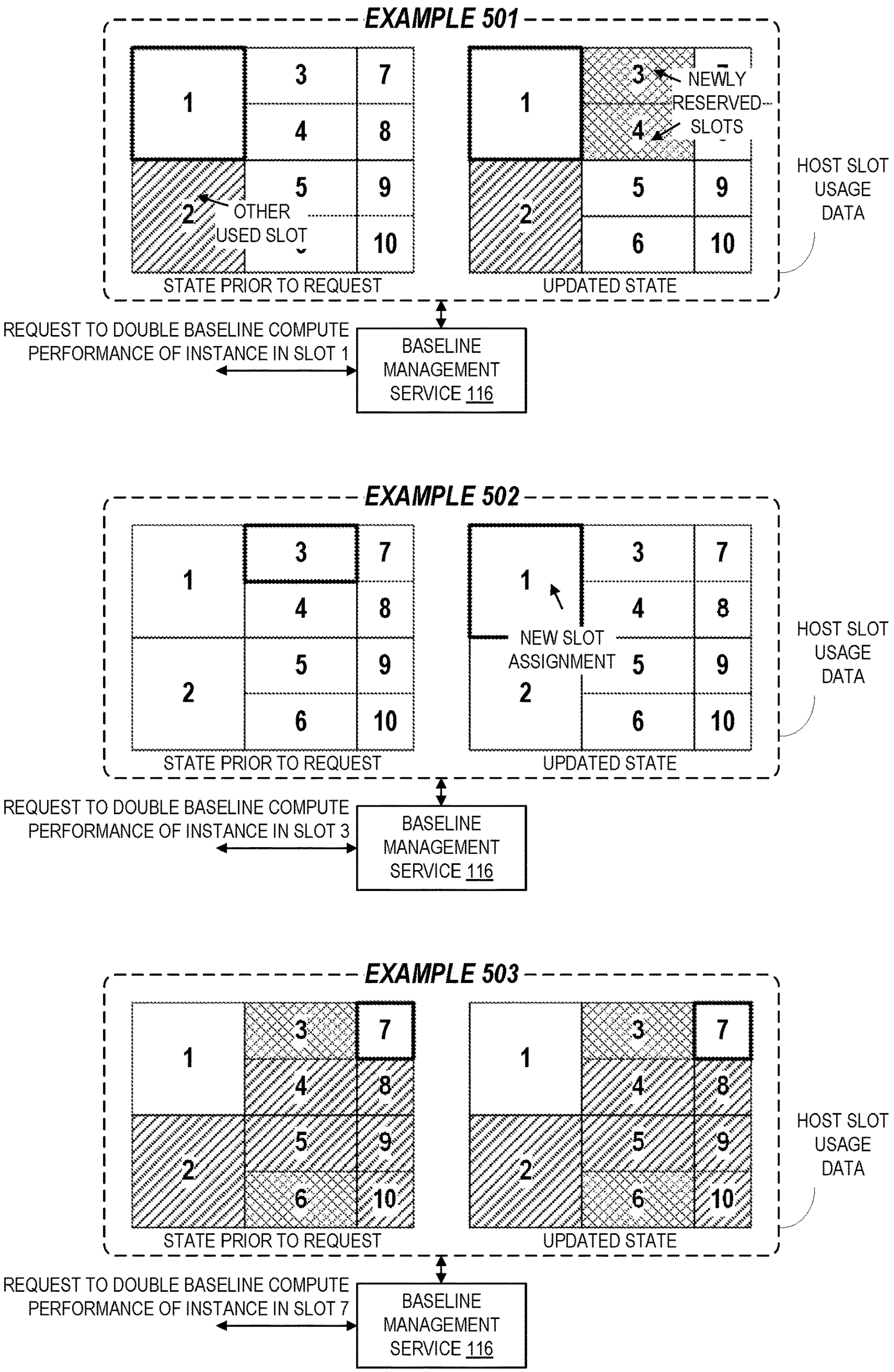
FIG. 5 is a diagram illustrating aspects of host capacity management with customizable baseline compute performance instances according to some examples.

FIG. 5 is a diagram illustrating aspects of host capacity management with customizable baseline compute performance instances according to some examples. As discussed above, one way of tracking host system capacity is via templates that define compute instance slots. Because customizable baseline performance compute instances can change the amount of compute capacity allocated for their baseline, the baseline management service 116 can update slot usage data (typically part of host system data 422) to account for those changes. Examples 501 through 503 motivate the discussion of various capacity tracking strategies using templates and slots. In each of the examples, the state of slot usage data is depicted graphically prior to receiving a request and after receiving a request.

In example 501, the baseline management service 116 is servicing a request to double the baseline compute performance of an instance using slot 1. Prior to receiving the request, the state of slot usage data shows that slot 2 is also "used." Assuming all policy requirements have passed, the baseline management service 116 can update the slot status of slots 3 and 4 from "available" to "reserved" to reflect the additional allocation of baseline compute capacity. The baseline management service 116 can also associate the instance identifier with slots 3 and 4 in addition to slot 1. As another example, the baseline management service 116 could have reserved slots 3, 9, and 10 (not shown). As this example illustrates, in reserving slots to account for increased allocations of baseline performance capacity, the size and type of slots can vary.

Note that the selection of slots to "reserve" to account for change to baseline compute performance increases can be determined in a number of ways. For example, the selection might prioritize same-size slots before proceeding to the next smaller slot-size, and so on, or vice versa. As another example, the selection might be based upon overall pool available for slots of different sizes. For example, if the number of available slots of a "small" size are lower than the number of available slots of a "medium" size, the selection can prioritize reserving medium slots over small slots.

In example 502, the baseline management service 116 is servicing a request to double the baseline compute performance of an instance using slot 3. Prior to receiving the request, the state of slot usage data shows that no other slots are "used." Assuming all policy requirements have passed, the baseline management service 116 can re-assign the instance from slot 3 to slot 1, changing the status identifier of slot 1 to "used" and of slot 3 to "available." The baseline management service 116 can also associate the instance identifier with 1. If the request had been to halve the baseline compute performance of an instance using slot 3, the baseline management service 116 could have re-assigned the instance from slot 3 to slot 7 and made the associates updates, for example. As this example illustrates, the usage of slots can change to reflect baseline performance capacity changes.

In example 503, the baseline management service 116 is servicing a request to increase the baseline compute performance of an instance using slot 7 by a factor of 1.5. Prior to receiving the request, the state of slot usage data shows that all of the remaining slots other than slot 1 are "used" (slots 2, 4, 5, 8-10) or "reserved" (slots 3 and 6). In some examples, an orphaned compute capacity policy requirement may restrict the above request from being granted. Reserving eight times the requested additional capacity leaves seven eights of that now-reserved capacity unavailable. An orphaned compute capacity policy requirement can place an upper limit on an amount of baseline compute capacity that would be reserved in excess of the requested change in granting a request. For example, a threshold limit of two could mean that no slot larger than one of slots 3 through 6 could be reserved to satisfy the request to double the capacity of the instance occupying slot 7. Since slots 3 through 6 are unavailable, the request would be denied. Of course, the baseline management service 116 service can attempt to free a slot for reservation that satisfies the threshold using the live migration techniques discussed above prior to denying the request. If no such policy is in place, the baseline management service 116 could have reserved slot 1 and updated the slot usage data accordingly.

Figure 6:
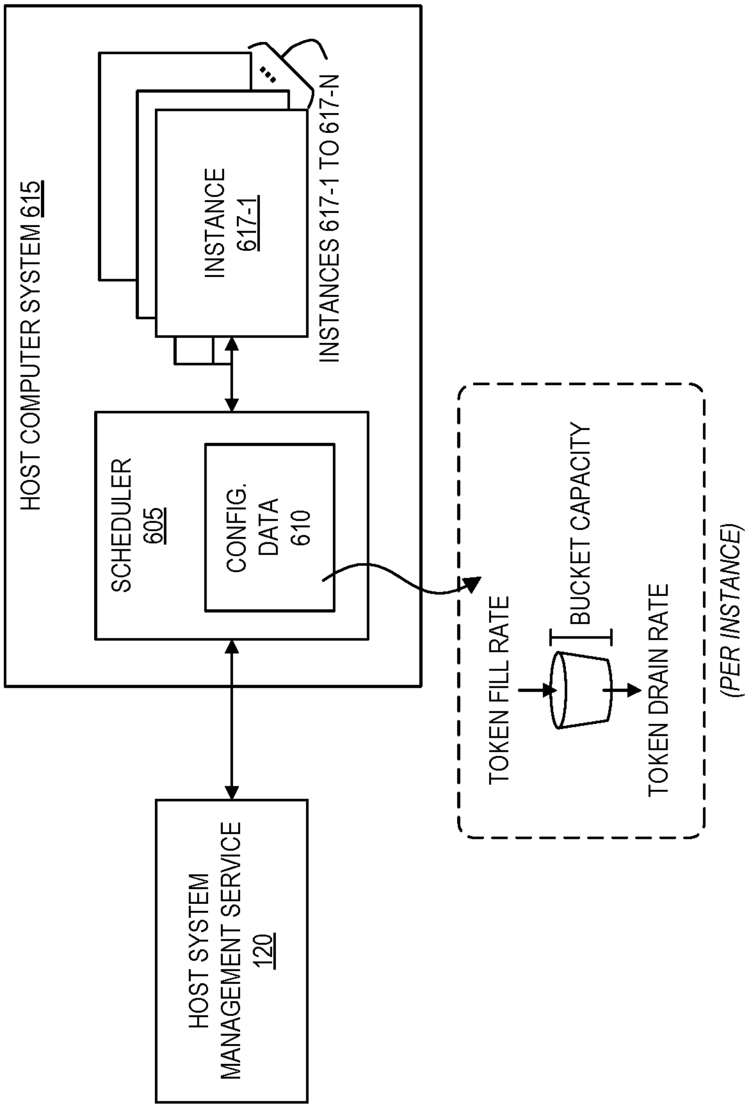
FIG. 6 is a diagram illustrating adjusting baseline compute performance for compute instances according to some examples.

FIG. 6 is a diagram illustrating adjusting baseline compute performance for compute instances according to some examples. As illustrated, a host computer system 615 includes a scheduler 605. The scheduler 605 allocates compute time amongst the instances 617 hosted by the host system 615 according to configuration data 610. Upon receiving a request to change the baseline compute performance of a compute instance, the host system management service 120 can update the configuration data 610 of the scheduler 605.

In some examples, the scheduler 617 can enforce baseline performance levels via hard limits imposed on the individual compute instance processes as specified in the configuration data 610. In changing the baseline compute performance for a compute instance, the host system management service 120 can update a limit associated with the compute instance in the configuration data 610.

In the illustrated example, the scheduler 605 can, for each process, allocate compute time to each compute instance pursuant to a token bucket algorithm. Each compute instance can have an equal priority. The scheduler 605 can maintain, for each compute instance, a token bucket. The scheduler 605 can allocate compute time to the compute instance if its token bucket contains sufficient tokens. As illustrated, a token bucket algorithm has a fill rate, a drain rate, and a capacity, and can be implemented, for example, using a counter with increment (fill rate) and decrement (drain rate) operations and having a maximum value (capacity). The drain rate can be the number of tokens consumed per time slice or per unit of wall clock time. For example, if compute time is divided into 1 ms slices and an allocate of one time slice of a vCPU corresponds to 1 token, the drain rate would be 1 token per time slice or 60,000 tokens per minute. The fill rate can be used to control the baseline performance level of the instance. To provide a 25% of one vCPU, the fill rate would be 1 token per four time slices or 15,000 tokens per minute. (Allocating compute time to the vCPU for 250 time slices would thus be 25% of a vCPU.) The capacity of the bucket can be used to determine how long the instance can operate above its baseline performance level, if desired. When scheduling compute instances for the next time slice, the scheduler 605 can check whether a compute instance's token bucket has sufficient tokens and, if so, allocate compute time to that instance. If not, the scheduler 605 can move on to the next compute instance. In this manner, when there is contention, each instance will trend toward its baseline compute performance level. In changing the baseline compute performance for a compute instance on a host system having a scheduler using a token bucket algorithm, the host system management service 120 can update a fill rate associated with the compute instance in the configuration data 610.

Figure 7:
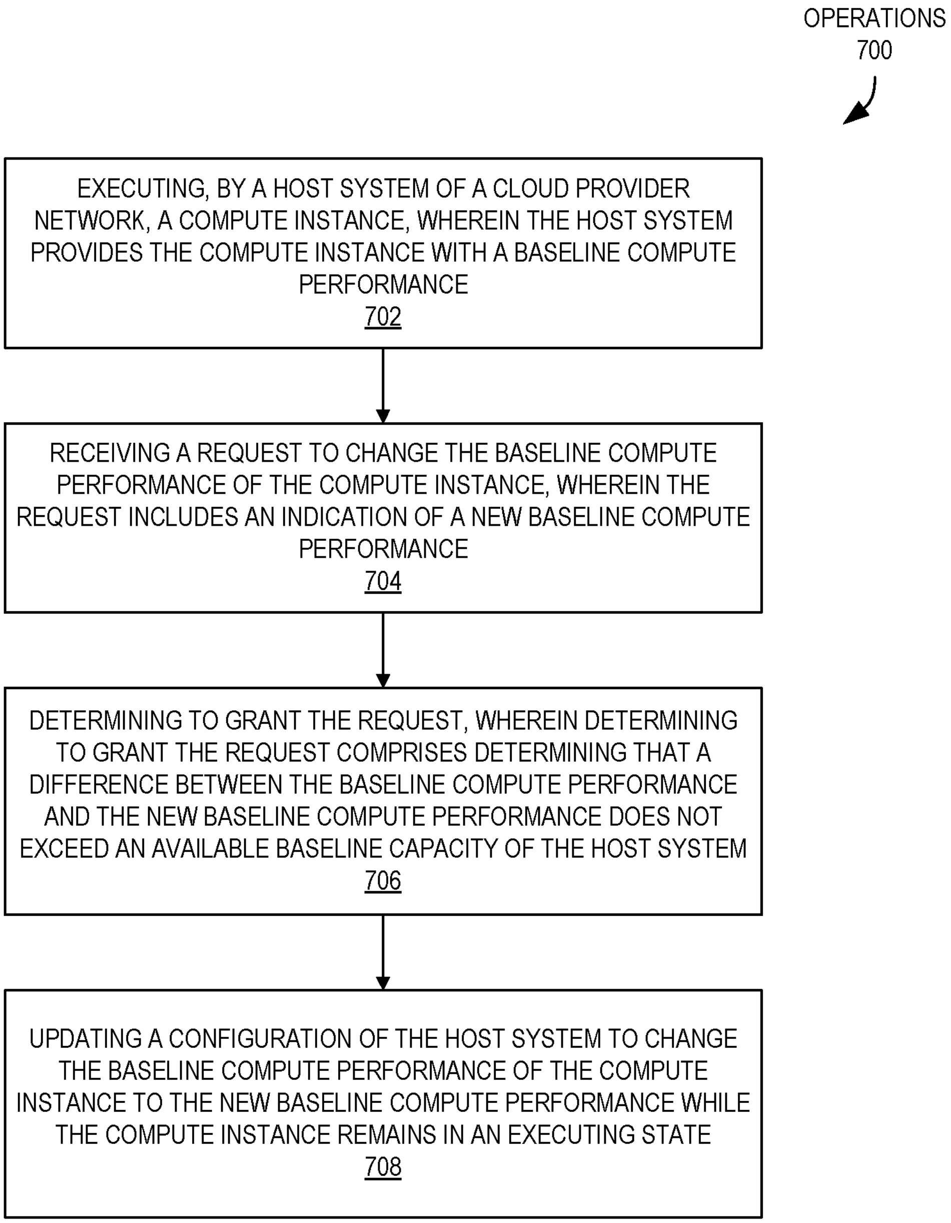
FIG. 7 is a flow diagram illustrating operations of a method for adjusting baseline compute performance of a compute instance according to some examples.

FIG. 7 is a flow diagram illustrating operations of a method 700 for adjusting baseline compute performance of a compute instance according to some examples. Some or all of the operations 700 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 700 are performed by the baseline management service 122 and/or the host system management service 120 of the other figures.

The operations 700 include, at block 702, executing, by a host system of a cloud provider network, a compute instance, wherein the host system provides the compute instance with a baseline compute performance. The operations 700 further include, at block 704, receiving a request to change the baseline compute performance of the compute instance, wherein the request includes an indication of a new baseline compute performance. The operations 700 further include, at block 706, determining to grant the request, wherein determining to grant the request comprises determining that a difference between the baseline compute performance and the new baseline compute performance does not exceed an available baseline capacity of the host system. The operations 700 further include, at block 708, updating a configuration of the host system to change the baseline compute performance of the compute instance to the new baseline compute performance while the compute instance remains in an executing state.

Figure 8:
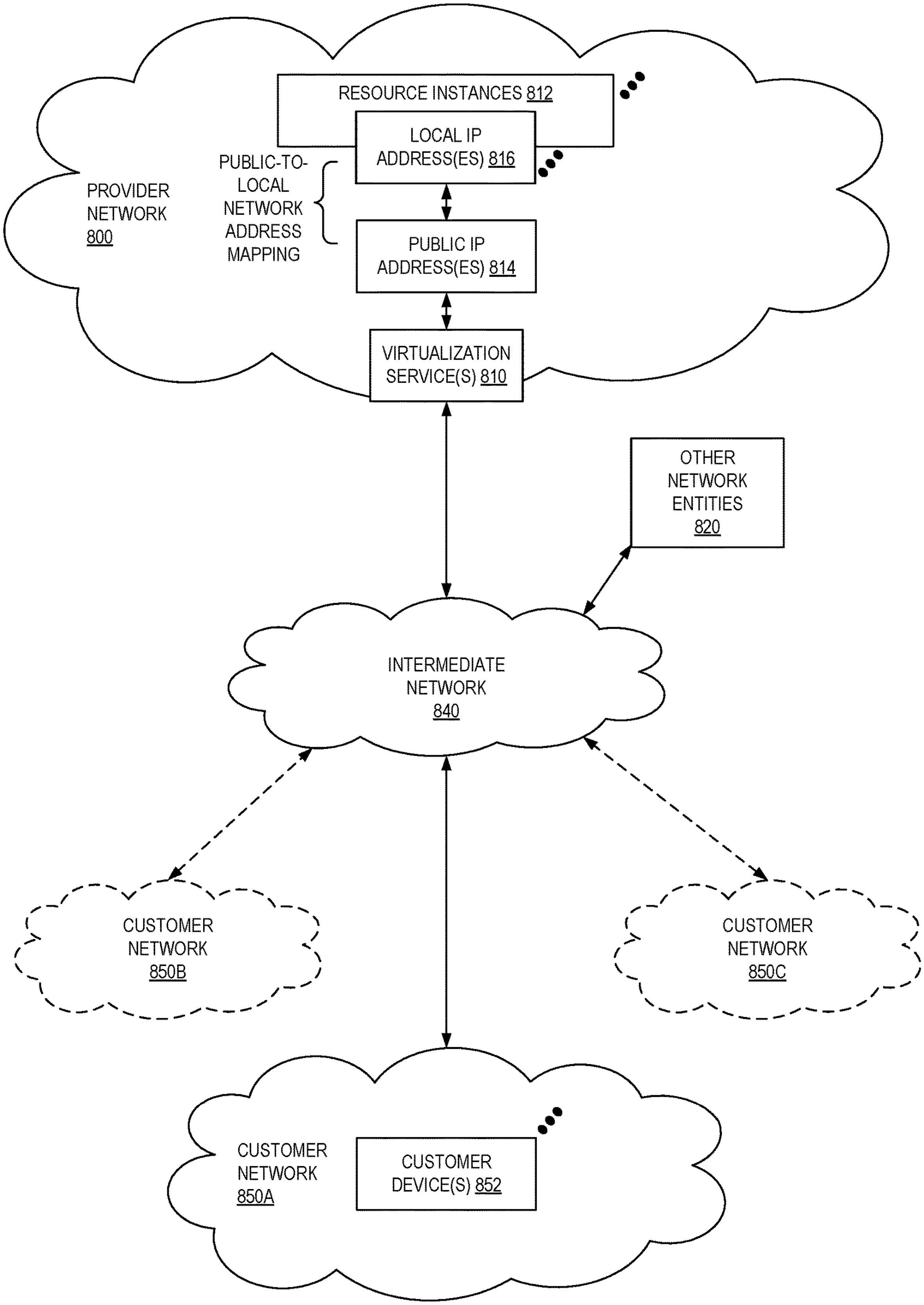
FIG. 8 illustrates an example provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
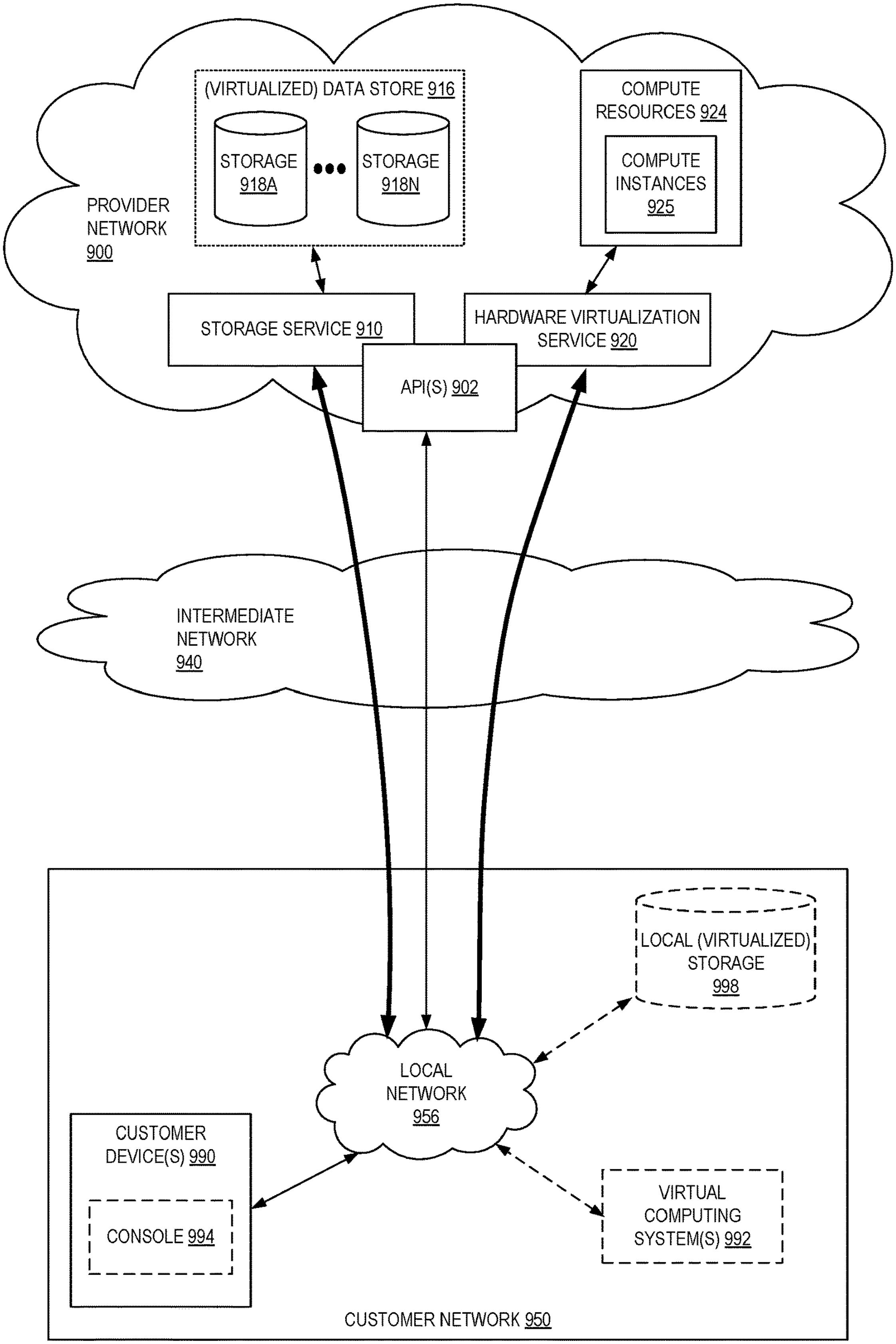
FIG. 9 is a block diagram of an example provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
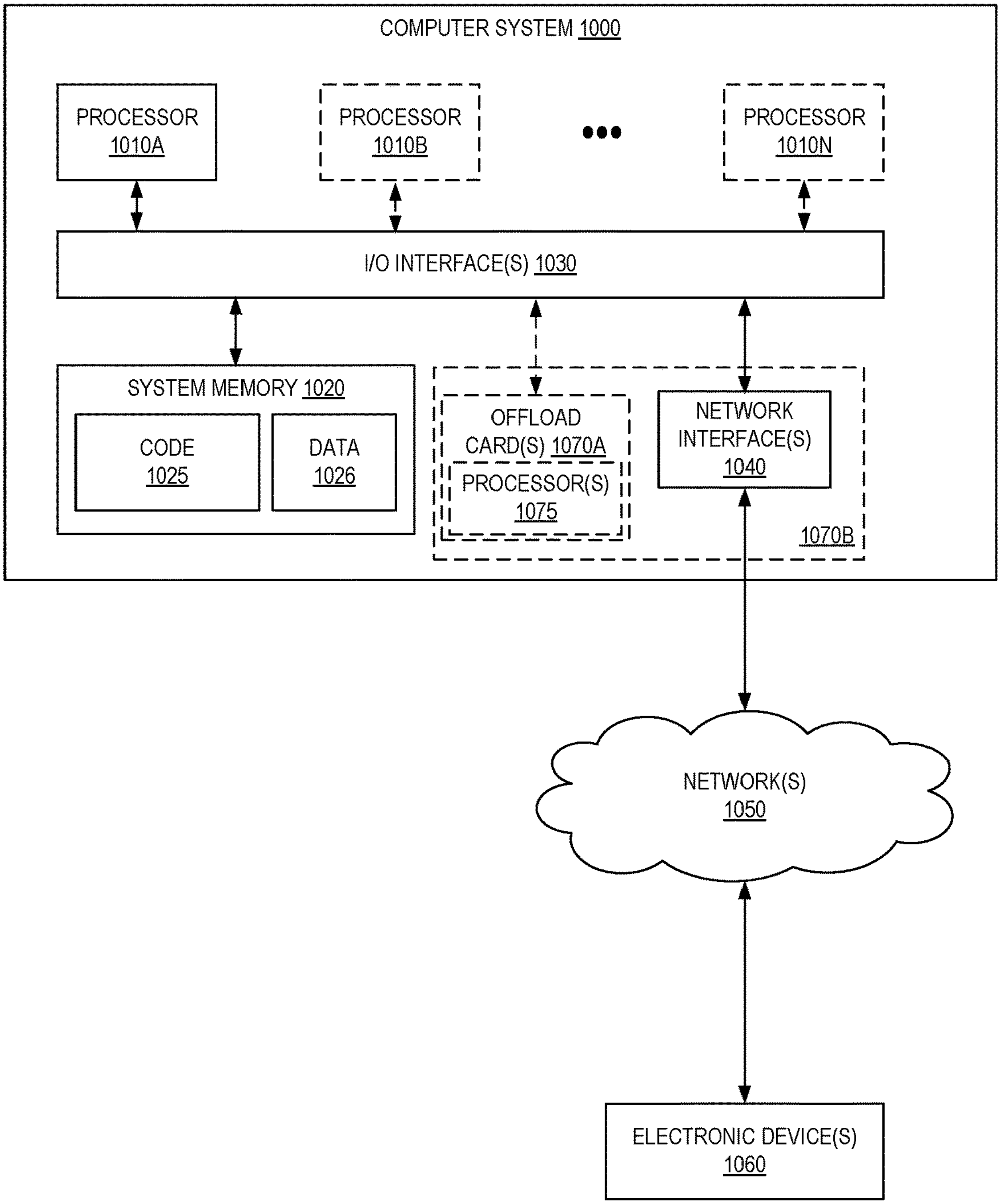
FIG. 10 is a block diagram illustrating an example computer system that can be used in some examples.

In some examples, a system that implements a portion or all of the techniques described herein can include a general-purpose computer system, such as the computer system 1000 illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as code 1025 (e.g., executable to implement, in whole or in part, the hardware virtualization service 112, the baseline migration service 116, the host system management service 120, and/or the live migration service 122 as described above) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computer system 1000. However, in some examples the virtualization manager implemented by the offload card(s) 1070A or 1070B can accommodate requests from other entities (e.g., from compute instances themselves), and cannot coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

executing, by a host system of a cloud provider network, a compute instance having an associated virtual processor, wherein the host system provides the compute instance with a baseline compute performance of a first percentage of the associated virtual processor, and wherein the host system includes a scheduler to allocate compute time between at least the compute instance and another compute instance executing on the host system;

receiving a request to change the baseline compute performance of the compute instance, wherein the request includes an indication of a new baseline compute performance of a second percentage of the associated virtual processor;

determining, by a baseline management service implemented as baseline management service code executing on one or more processors in the cloud provider network, to grant the request, wherein determining to grant the request comprises:

determining an available baseline capacity of the host system;

determining that a difference between the baseline compute performance and the new baseline compute performance exceeds the available baseline capacity of the host system;

based on determining the difference between the baseline compute performance and the new baseline compute performance exceeds the available baseline capacity of the host system, obtaining an estimated time to live migrate another compute instance executing on the host system to another host system;

determining the estimated time is below a threshold specified in a live migration policy requirement;

based on determining the estimated time is below the threshold specified in the live migration policy requirement, initiating a live migration of the another compute instance executing on the host system to the another host system; and based on determining the estimated time is below the threshold specified in the live migration policy requirement, determining to grant the request to change the baseline compute performance of the compute instance; and updating a parameter of the scheduler to change the baseline compute performance of the compute instance to the new baseline compute performance while the compute instance remains in an executing state.

2. The computer-implemented method of claim 1, further comprising, prior to updating a configuration of the host system, initiating a live migration of another compute instance executing on the host system to another host system to increase the available baseline capacity of the host system.

3. The computer-implemented method of claim 1, wherein determining to grant the request further comprises determining that a compute utilization of the host system plus the difference between the baseline compute performance and the new baseline compute performance exceeds a threshold below a total baseline capacity of the host system.

4. A computer-implemented method comprising:

executing, by a host system of a cloud provider network, a compute instance, wherein the host system provides the compute instance with a baseline compute performance;

receiving a request to change the baseline compute performance of the compute instance, wherein the request includes an indication of a new baseline compute performance;

determining, by a baseline management service implemented as baseline management service code executing on one or more processors in the cloud provider network, to grant the request, wherein determining to grant the request comprises:

determining an available baseline capacity of the host system;

determining that a difference between the baseline compute performance and the new baseline compute performance exceeds the available baseline capacity of the host system;

based on determining the difference between the baseline compute performance and the new baseline compute performance exceeds the available baseline capacity of the host system, obtaining an estimated time to live migrate another compute instance executing on the host system to another host system;

determining the estimated time is below a threshold specified in a live migration policy requirement;

based on determining the estimated time is below the threshold specified in the live migration policy requirement, initiating a live migration of the another compute instance executing on the host system to the another host system; and based on determining the estimated time is below the threshold specified in the live migration policy requirement, determining to grant the request to change the baseline compute performance of the compute instance; and updating a configuration of the host system to change the baseline compute performance of the compute instance to the new baseline compute performance while the compute instance remains in an executing state.

5. The computer-implemented method of claim 4, wherein the compute instance has an associated virtual processor, and wherein the request to change the baseline compute performance of the compute instance comprises changing a baseline percentage of the associated virtual processor from a first percentage to a second percentage.

6. The computer-implemented method of claim 4:

wherein the host system includes a scheduler to allocate compute time between at least the compute instance and another compute instance executing on the host system; and wherein updating a configuration of the host system comprises updating a parameter of the scheduler to change the baseline compute performance of the compute instance.

7. The computer-implemented method of claim 6, wherein the scheduler allocates compute time to the compute instance based upon an availability of an amount of tokens in a token bucket associated with the compute instance, and wherein the parameter is a token bucket fill rate.

8. The computer-implemented method of claim 4, further comprising, prior to updating a configuration of the host system, initiating a live migration of another compute instance executing on the host system to another host system to increase the available baseline capacity of the host system.

9. The computer-implemented method of claim 8, wherein determining to grant the request further comprises:

obtaining an estimated time to migrate another compute instance hosted by the host system to another host computer system; and determining that the estimated time is below a threshold.

10. The computer-implemented method of claim 4, wherein determining to grant the request further comprises determining that another request to change the baseline compute performance of the compute instance was not granted within a period of time prior to receiving the request.

11. The computer-implemented method of claim 4, wherein determining to grant the request further comprises determining that a compute utilization of the host system plus the difference between the baseline compute performance and the new baseline compute performance exceeds a threshold below a total baseline capacity of the host system.

12. The computer-implemented method of claim 4, further comprising:

adding the request to a queue of pending baseline compute performance change requests, wherein each request in the queue has an associated host system; and wherein determining to grant the request further comprises:

determining that a number of co-pending requests having the same associated host system is below a threshold.

13. The computer-implemented method of claim 4, wherein the available baseline capacity is a total baseline performance capacity of the host system less a total allocated baseline performance capacity of the host system, wherein the total allocated baseline performance capacity of the host system is based at least in part on a sum of a baseline compute performance of each compute instance of a plurality of compute instances executed by the host system, and wherein the plurality of compute instances includes the compute instance.

14. The computer-implemented method of claim 13:

wherein the host system has an associated template having a plurality of slots, each slot of the plurality of slots associated with an amount of baseline compute capacity of the host system;

reserving an unused slot having an associated unused amount of baseline compute capacity for at least a portion of a difference between the new baseline compute performance and the baseline compute performance; and wherein the total allocated baseline performance capacity is further based at least in part on the unused amount of baseline compute capacity associated with the reserved unused slot.

15. The computer-implemented method of claim 4, wherein determining to grant the request further comprises determining that an additional amount of baseline compute capacity that would be reserved to grant the request is below a threshold, wherein the additional amount of baseline compute capacity is in excess of the difference between the new baseline compute performance and the baseline compute performance.

16. A system comprising:

a host computer system of a cloud provider network, the host computer system including instructions that upon execution cause the host computer system to:

execute a compute instance, wherein the host system provides the compute instance with a baseline compute performance; and a second one or more electronic devices to implement a baseline management service in the cloud provider network, the baseline management service implemented as baseline management service code including instructions that upon execution by one or more processors in the cloud provider network cause the baseline management service to:

receive a request to change the baseline compute performance of the compute instance, wherein the request includes an indication of a new baseline compute performance;

determine to grant the request based at least in part on one or more instructions to:

determine an available baseline capacity of the host system;

determine that a difference between the baseline compute performance and the new baseline compute performance exceeds the available baseline capacity of the host system;

based on determining the difference between the baseline compute performance and the new baseline compute performance exceeds the available baseline capacity of the host system, obtaining an estimated time to live migrate another compute instance executing on the host system to another host system;

determining the estimated time is below a threshold specified in a live migration policy requirement;

based on determining the estimated time is below the threshold specified in the live migration policy requirement, initiating a live migration of the another compute instance executing on the host system to the another host system; and based on determining the estimated time is below the threshold specified in the live migration policy requirement, determining to grant the request to change the baseline compute performance of the compute instance; and update a configuration of the host system to change the baseline compute performance of the compute instance to the new baseline compute performance while the compute instance remains in an executing state.

17. The system of claim 16, wherein the compute instance has an associated virtual processor, and wherein the request to change the baseline compute performance of the compute instance comprises changing a baseline percentage of the associated virtual processor from a first percentage to a second percentage.

18. The system of claim 16:

wherein the host computer system includes further instructions that upon execution cause the host computer system to allocate compute time, by a scheduler, between at least the compute instance and another compute instance executing on the host system; and wherein the baseline management service includes further instructions that upon execution cause the baseline management service to update a parameter of the scheduler to change the baseline compute performance of the compute instance.

19. The system of claim 16, wherein the baseline management service includes further instructions that upon execution cause the baseline management service to, prior to updating a configuration of the host system to change the baseline compute performance of the compute instance to the new baseline compute performance while the compute instance remains in an executing state, initiate a migration of another compute instance executing on the host system to another host system to increase the available baseline capacity of the host system.

20. The system of claim 16, wherein the available baseline capacity is a total baseline performance capacity of the host system less a total allocated baseline performance capacity of the host system, wherein the total allocated baseline performance capacity of the host system is based at least in part on a sum of a baseline compute performance of each compute instance of a plurality of compute instances executed by the host system, and wherein the plurality of compute instances includes the compute instance.

* * * * *